(12) United States Patent
Zhang

(10) Patent No.: US 10,496,567 B2
(45) Date of Patent: Dec. 3, 2019

(54) WIRELESS CONFIGURABLE FLASH MEMORY

(71) Applicant: WUHAN SYNTEK LTD., Wuhan (CN)

(72) Inventor: Kefeng Zhang, Wuhan (CN)

( * ) Notice: Subject to any disclaimer, the term of this patent is extended or adjusted under 35 U.S.C. 154(b) by 0 days.

(21) Appl. No.: 16/153,778

(22) Filed: Oct. 7, 2018

(65) Prior Publication Data

US 2019/0188161 A1    Jun. 20, 2019

Related U.S. Application Data

(63) Continuation of application No. PCT/CN2016/078958, filed on Apr. 11, 2016.

(51) Int. Cl.
| | |
|---|---|
| *G06F 13/16* | (2006.01) |
| *G06F 3/06* | (2006.01) |
| *G06F 12/02* | (2006.01) |
| *H04B 1/40* | (2015.01) |

(52) U.S. Cl.
CPC ............ *G06F 13/1668* (2013.01); *G06F 3/06* (2013.01); *G06F 12/0246* (2013.01); *H04B 1/40* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 6,670,982 B2 * | 12/2003 | Clough | H04N 1/00132 348/14.01 |
| 2002/0137501 A1 | 9/2002 | Datar | |

(Continued)

FOREIGN PATENT DOCUMENTS

| | | |
|---|---|---|
| CN | 2681186 Y | 2/2005 |
| CN | 1661581 A | 8/2005 |

(Continued)

OTHER PUBLICATIONS

Internation Search Report of PCT/CN2016/078958, dated Dec. 27, 2016.

*Primary Examiner* — Henry Tsai
*Assistant Examiner* — Aurangzeb Hassan
(74) *Attorney, Agent, or Firm* — Andrew C. Cheng

(57) ABSTRACT

A wireless configurable flash memory that facilitates wireless access of data includes a storage module configured to store the data, a configurable protocol module configured to parse frames of various protocols according to a configuration parameter and a control module configured to control wireless reception and transmission of the data and parsing of wireless protocols. By means of the configurable protocol module, the value of each field defined in a protocol are reconfigurable, so that the wireless configurable flash memory can be self-adaptive to changes in the protocols, identification of protocols is converted to simple comparison on the values of respective fields of the protocols, and data of multiple protocols can be transmitted and received though a simple configurable protocol module. Thus, the wireless configurable flash memory for wireless access of the data has the characteristics of high self-adaptability, small area and low power consumption.

9 Claims, 7 Drawing Sheets

(56) References Cited

U.S. PATENT DOCUMENTS

| | | | |
|---|---|---|---|
| 2008/0320250 A1* | 12/2008 | Rofougaran | G03G 15/6508 |
| | | | 711/154 |
| 2012/0212375 A1* | 8/2012 | Depree, IV | B82Y 10/00 |
| | | | 343/700 MS |
| 2013/0109323 A1 | 5/2013 | Ruutu et al. | |
| 2013/0326495 A1 | 12/2013 | Reunamaki et al. | |
| 2013/0335585 A1* | 12/2013 | Toyoshima | G06F 3/005 |
| | | | 348/207.1 |
| 2016/0006677 A1* | 1/2016 | Lamb | H04L 49/3045 |
| | | | 370/412 |
| 2016/0037382 A1* | 2/2016 | Parvathaneni | H04L 1/1874 |
| | | | 370/329 |

FOREIGN PATENT DOCUMENTS

| | | |
|---|---|---|
| CN | 1667594 A | 9/2005 |
| CN | 1797312 A | 7/2006 |
| CN | 101286798 A | 10/2008 |
| CN | 101473310 A | 7/2009 |
| CN | 102708913 A | 10/2012 |
| CN | 104780140 A | 7/2015 |
| CN | 104901877 A | 9/2015 |

* cited by examiner

WIRELESS CONFIGURABLE FLASH MEMORY

CROSS-REFERENCE TO RELATED APPLICATIONS

This application is a continuation of International Patent Application No. PCT/CN2016/078958 with a filing date of Apr. 11, 2016. The content of the aforementioned application, including any intervening amendments thereto, is incorporated herein by reference.

TECHNICAL FIELD

The present disclosure relates to the technical field of wireless storage, and particularly to a wireless configurable flash memory and an electronic device including the wireless configurable flash memory.

BACKGROUND OF THE PRESENT INVENTION

Flash memory has become popular, because it combines the advantages of high density and low cost. The flash memory can be rewritten and can hold its content without power. It can be used in many portable electronic products, such as computers, cellular phones, voice recorders, and the like, as well as in many large electronic systems, such as automobiles, airplanes, industrial control systems, etc.

Conventionally, a flash memory can be physically connected with a host (for example via a universal serial port (USB)), wherein data can be transferred from a host to the flash memory. In some technical solutions, data can be transferred wirelessly between the flash memory and the host. The wireless communication technology improves convenience of data transmission. There are a plurality of protocols for wireless data transmission, such as Bluetooth, WIFI, and the like. In prior art, in order to make the wireless flash memory be capable of receiving and transmitting wireless communication data with different protocols, several adaptors are arranged with each one corresponding to one communication protocol independently. In this case, the amount of the adaptors should not be too large in order not to make the area and power consumption of the flash memory too large. That is to say, a designed flash memory can only receive and transmit data of several constant protocols and cannot be compatible to data of other wireless communication protocols. Thus, it is necessary to improve a structure of the wireless flash memory and a data communication method so that they are compatible to more communication protocols and have the advantages of small area and low power consumption.

SUMMARY OF PRESENT INVENTION

Aiming at the defects in the prior art that the wireless flash memory is only compatible to several fixed communication protocols for data communication and is large in area and high in power consumption, the present disclosure provides a wireless configurable flash memory which is compatible to a plurality of communication protocols for data communication and is small in area and low in power consumption.

Aiming at the above technical problems, the technical solutions proposed in the present disclosure are as follows:

In one aspect, a wireless configurable flash memory that facilitates wireless access of data is provided, including: a storage module configured to store the data; a configurable protocol module configured to parse frames of various protocols according to a configuration parameter, wherein the configurable protocol module includes: a frame structure description table configured to store a first frame header address pointer, a first frame tail address pointer and a value of each field defined in a communication protocol, wherein the first frame header address pointer and the first frame tail address pointer point to a storage location for the value of each field defined in the communication protocol, and the first frame header address pointer and the first frame tail address pointer are configurable so as to change the value of each field defined in the communication protocol; and a frame parsing unit, configured to acquire a frame header of received data to acquire values of respective fields of current communication protocol, and parse current communication protocol by comparing values of respective fields of current communication protocol with that of the communication protocol in the frame structure description table; and a control module configured to control wireless reception and transmission of the data and parsing of wireless protocols.

Advantageously, the wireless configurable flash memory further includes a wireless receiving and transmitting module configured to receive and transmit the data wirelessly; the wireless receiving and transmitting module includes a sound receiving and transmitting unit configured to receive and transmit acoustic waves, an antenna unit configured to receive and transmit electromagnetic waves, a light receiving and transmitting unit configured to receive and transmit light waves and a magnetic signal receiving and transmitting unit configured to receive and transmit magnetic signals.

Advantageously, the control module includes a protocol state description table configured to store a second frame header address pointer, a second frame tail address pointer and state transition values; the second frame header address pointer and the second frame tail address pointer point to a storage location for state transition values contained in the communication protocol, the control module controls wireless reception and transmission of the data and parsing of wireless protocols according to the state transition values; and the second frame header address pointer and the second frame tail address pointer are configurable so as to change the state transition values stored in the protocol state description table.

Advantageously, the control module further includes a state transition judging unit configured to determine conditions for transferring a state into a next state; the state transition judging unit includes: a code value input circuit configured to provide a configurable code value; and a logic operation circuit configured to perform logic operation according to the code value provided by the code value input circuit so as to output an operation result to determine whether to transfer into the next state.

Advantageously, the code value includes: an operation code value configured to determine a logic operation type of the logic operation circuit; a current triggering event source code value configured to represent a current event source; and a target event source code value, configured to represent a target event source.

Advantageously, the wireless configurable flash memory further includes a power source module configured to supply power for respective modules contained in the wireless configurable flash memory.

Advantageously, the wireless configurable flash memory further includes a power source regulating module configured to regulate one or more voltage or current provided to one or more modules contained in the wireless configurable flash memory.

Advantageously, the wireless configurable flash memory is configured to facilitate wireless communication of the data in a peer to peer mode or an ad hoc mode.

Advantageously, the wireless configurable flash memory further includes a crypto mode configured to encrypt or decrypt the data during wireless communication.

In another aspect, an electronic device is further provided, including the above wireless configurable flash memory.

The following beneficial effects can be achieved by implementing embodiment of the present disclosure: the value of each field defined in the protocols are reconfigurable through the configurable protocol module, so that the wireless configurable flash memory can be self-adaptive to changes in protocols, identification of the protocols becomes simple comparison on values of respective fields of the protocols, and therefore data of a plurality of protocols can be received and transmitted using only a simple configurable protocol module. Thus, the wireless configurable flash memory disclosed in the present disclosure has the characteristics of high self-adaptability, small area and low power consumption.

DESCRIPTION OF THE DRAWINGS

In order to more clearly illustrate embodiments of the present disclosure or technical solutions in the prior art, drawings used in description of embodiments or the prior art will be simply described. Apparently, drawings in the description below are only some embodiments of the present disclosure, and for one of ordinary skill in the art, other drawings can also be obtained according to these drawings without any creative effort.

DETAILED DESCRIPTION OF PREFERRED EMBODIMENTS

The technical solutions in the embodiments of the disclosure will be described clearly and thoroughly with reference to the accompanying drawings and embodiments in the following. Obviously, the embodiments described below are only partial but not all of the embodiments of the disclosure. Any other embodiments obtained by the one of ordinary skill in the art without creative efforts under the teaching of these embodiments should fall into the scope of the disclosure.

Embodiment 1

Figure 1:
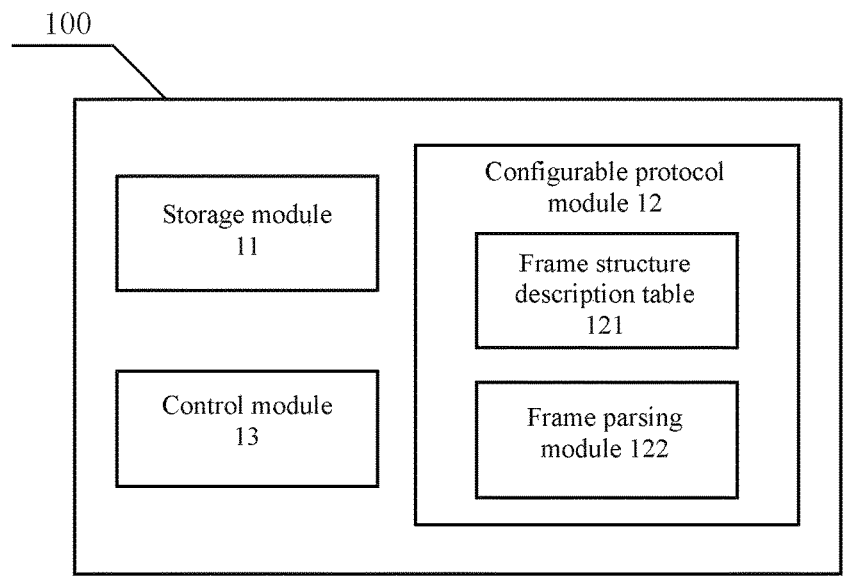
FIG. 1 is a structural diagram of a wireless configurable flash memory according to an embodiment of the present disclosure.
Figure 2:
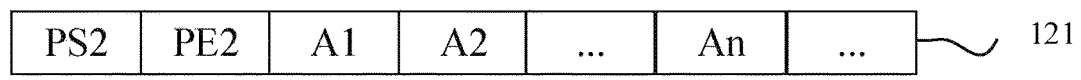
FIG. 2 is a structural diagram of a frame structure description table as shown in FIG. 1.
Figure 3:
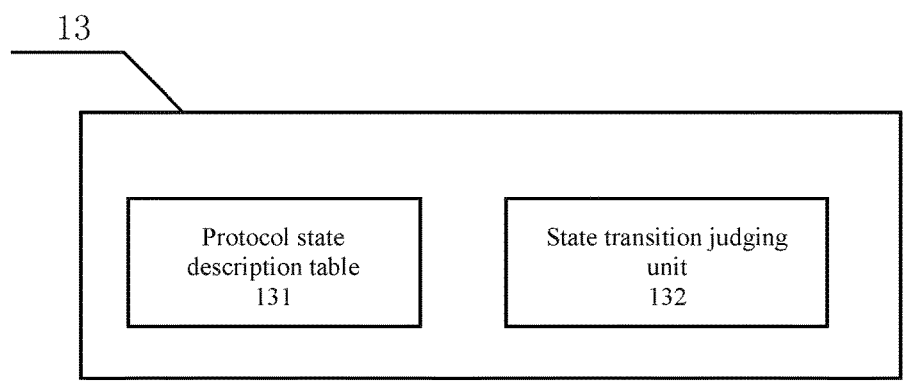
FIG. 3 is a structural diagram of a control module as shown in FIG. 1.

This embodiment provides a wireless configurable flash memory. Referring to FIGS. 1 and 2, this wireless configurable flash memory 100 facilitates wireless access of data and comprises a storage module 11 configured to store the data, a configurable protocol module 12 configured to parse frames of various protocols according to a configuration parameter and a control module 13 configured to control wireless reception and transmission of the data and parsing of wireless protocols.

In this embodiment, the storage module 11 may include multiple storage positions (for example storage units) configured to access data. The configurable protocol module 12 includes a frame structure description table 121 and a fame parsing unit 122. As shown in FIG. 2, the frame structure description table 121 is configured to store a first frame header address pointer PS1, a first frame tail address pointer PE1 and values A1~An of respective fields specified in a communication protocol, wherein n is the number of the fields of the current protocol. The first frame header address pointer PS1 and the first frame tail address pointer PE1 point to a storage location for a value of each field defined in the communication protocol. The first frame header address pointer PS1 and the first frame tail address pointer PE1 are configurable, and therefore the first frame header address pointer PS1 and the first frame tail address pointer PE1 may point to different storage locations for storing a value of each field defined in different protocols. Thus, a value of each field defined in the communication protocols stored in the frame structure description table 121 may be changed through configuration of the first frame header address pointer PS1 and the first frame tail address pointer PE1, thereby storing the a value of each field defined in a certain specific communication protocol in the frame structure description table 121. A frame parsing unit 122 is configured to acquire a frame header of the received data to acquire values of respective fields of current communication protocol and to parse current communication protocol associated with the data received wirelessly by comparing values of respective fields of current communication protocol with that of the communication protocol in the frame structure description table 121.

In the process of data communication, a data packet or a frame includes three parts: a frame header, frame data and check data. For different communication protocols, frame headers in the data packet or the frame are different from each other. In this embodiment, the frame headers of the frames of various protocols are abstracted to values of respective fields, and there is no concern about particular format of the frame of each protocol. In such a way, a simple and universal frame structure description table may be used to describe frame structures of different protocols. Furthermore, identification of a specific protocol may be simplified as comparison on a value of each field defined in the protocols. When a new wireless communication protocol is defined, a value of each field defined in this communication protocol will be stored, then the first frame header address pointer and the first frame tail address pointer are configured so that they point to a storage location for a value of each field defined in the new communication protocol.

It should be understood that in the present disclosure, terms such as "first", "second", "third" and "fourth" are not intended to define an order and are just for the purpose of distinguishing names of parts.

The a value of each field defined in the protocols may be reconfigurable through the configurable protocol module, so that the wireless configurable flash memory can be self-adaptive to changes in protocols, and identification of the protocols is simplified as comparison on a value of each field defined in the protocols, and therefore data of a plurality of protocol can be received and transmitted using only a simple configurable protocol module. Thus, the wireless configurable flash memory has the characteristics of high self-adaptability, small area and low power consumption.

Figure 4:
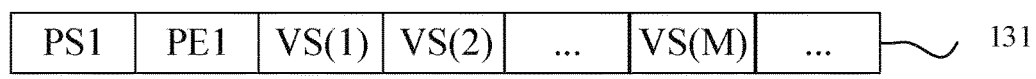
FIG. 4 is a structural diagram of a protocol state description table as shown in FIG. 3.

Further, as shown in FIGS. 3-6, the control module 13 may include a protocol state description table 131 and a state transition judging unit 132. As shown in FIG. 4, the protocol state description table 131 is configured to store a second frame header address pointer PS2, a second frame tail address pointer PE2 and state transition values VS(1)~VS(M), wherein, M is the number of the states of the current protocol. The second frame header address pointer PS2 and the second frame tail address pointer PE2 point to a storage location for state transition values contained in a communication protocol, and the control module 13 controls wireless reception and transmission of the data and parsing of wireless protocols according to the state transition values VS(1)~VS(M). The second frame header address pointer PS2 and the second frame tail address pointer PE2 are configurable so as to change the state transition values VS(1)~VS(M) stored in the protocol state description table 131. Particularly, the second frame header address pointer PS2 and the second frame tail address pointer PE2 may be configurable, and therefore the second frame header address pointer PS2 and the second frame tail address pointer PE2 may point to different storage locations for storing state transition values of different protocols.

In this embodiment, operations under different protocols (for example, transmission of commands, response, output of signals and collection of data, etc.) are abstracted into protocol states; respective protocol state and specific operation under each state are defined for each protocol. In such a way, operations under different protocol states are represented by using a simple and universal protocol state description table. Thus, reconfiguration of state transition values of particular protocols may be achieved through the protocol state description table 131.

Figure 5:
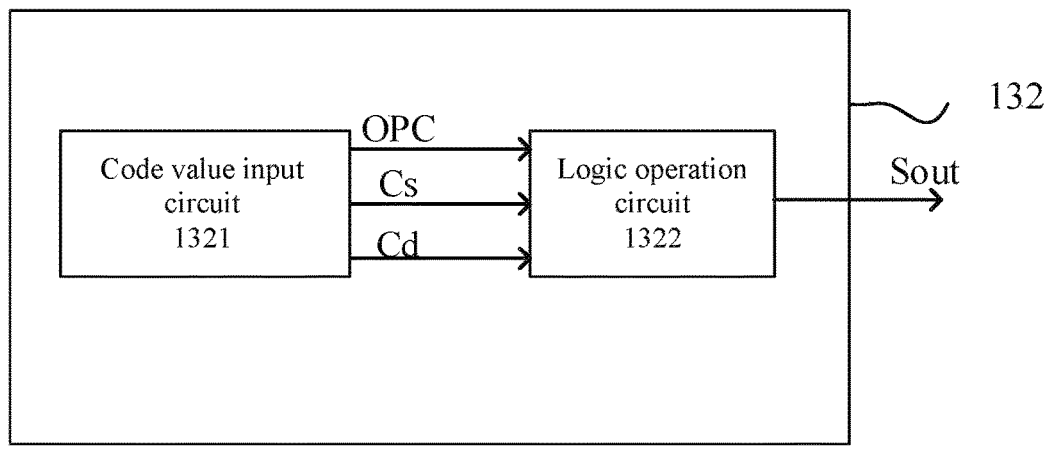
FIG. 5 is a structural diagram of a state transition judging unit as shown in FIG. 4.

Further, FIG. 5 shows a structural diagram of a state transition judging unit 132. As shown in FIG. 5, the state transition judging unit 132 includes a code value input circuit 1321 and a logic operation circuit 1322. The code value input circuit 1321 is configured to provide reconfigurable code values, and the code value includes an operation code value OPC, a current triggering event source code value Cs and a target event source code value Cd. An operation type of the logic operation circuit 1322 may be determined through the operation code value OPC. For example, if the operation code value OPC is 2 bits, 4 types of logic operations may be defined; and if the OPC is 3 bits, 8 types of logic operations may be defined. Values of OPC may be configured by a user so as to fit to different protocols. Cs may be configured to represent the current event source, and its value may also be configured to fit to different protocols. Cd is configured to represent a target event source to be logically operated with the current event source so as to determine whether to perform state transition under the current event source.

Figure 6:
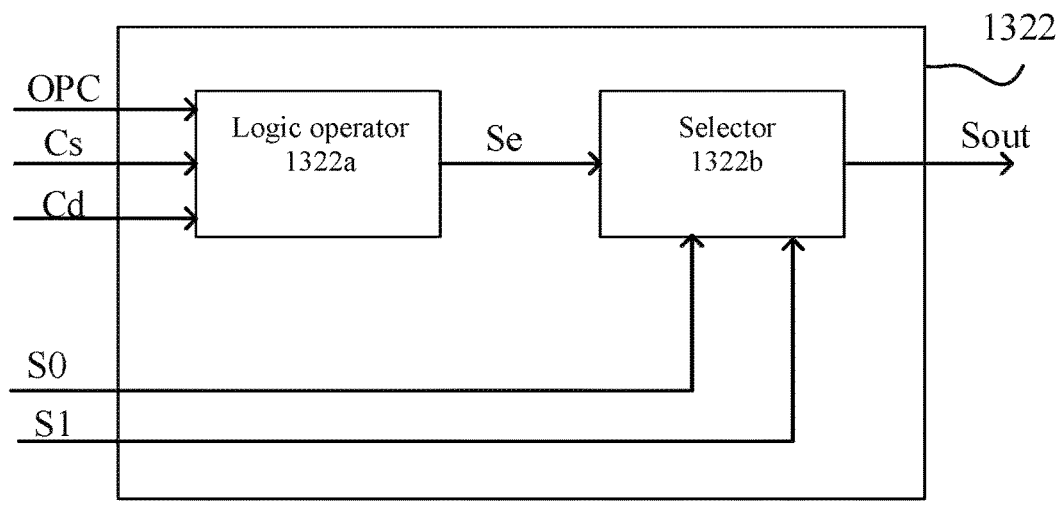
FIG. 6 is a structural diagram of a logic operation circuit as shown in FIG. 5.

Specifically, as shown in FIG. 6, the logic operation circuit 1322 may include a logic operator 1322a and a selector 1322b. S0 means maintaining the current state, and S1 means transferring to a next state. In one embodiment, if OPC is 2 bits, OPC may have four values 00, 01, 10 and 11. The logic operator may define four operations, for example And, OR, XOR and XNOR. Of course, more complicated operations may also be defined according to practical demand. The logic of the selector 1322b is as follows:

$$Sout = \begin{cases} S1 \text{ if } Se = 1 \text{ (transferring into a next state)} \\ S0 \text{ if } Se = 0 \text{ (no transfer)} \end{cases}$$

It should be understood that there are many implementation modes of the logic operation circuit 1322, and among them, one possible solution is only described in this embodiment. Those skilled in the art may design various appreciate implementation modes according to practical demand under the teaching of this embodiment. This is right fundamental exhibition that a state machine of the present disclosure may be reconfigurable.

Thus, the state transition judging circuit of a state machine of the present disclosure may also be reconfigurable, and different state transition models may be reconfigured by inputting different code values, to fit to different protocols.

Embodiment 2

Figure 7:
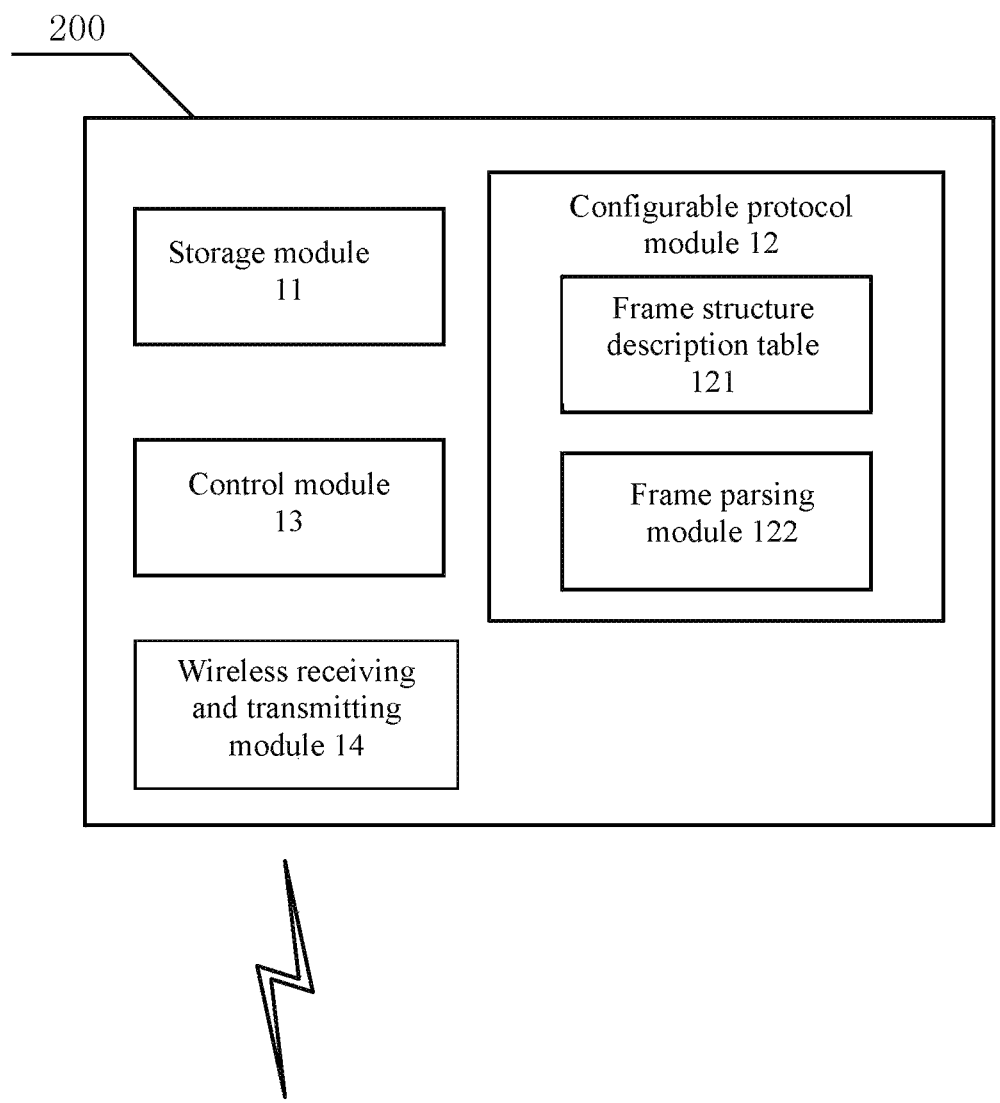
FIG. 7 is a structural diagram of a wireless configurable flash memory according to another embodiment of the present disclosure.
Figure 8:
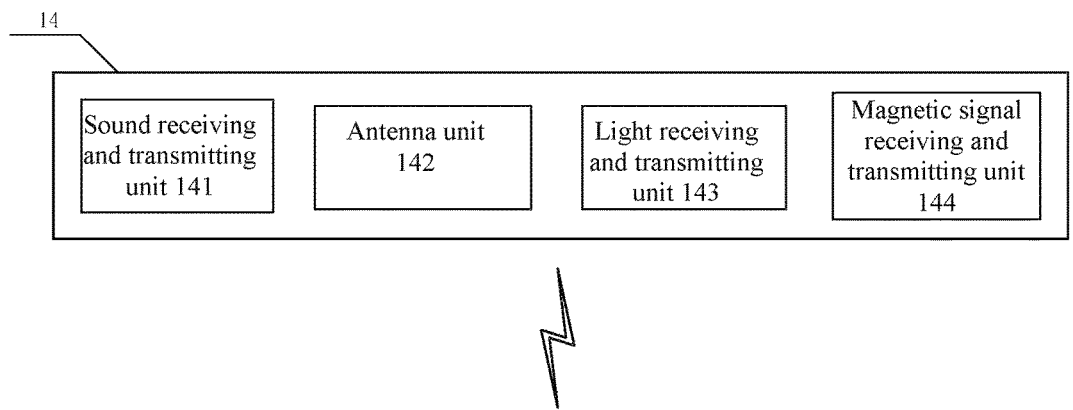
FIG. 8 is a structural diagram of a wireless receiving and transmitting module as shown in FIG. 7.

This embodiment provides a wireless configurable flash memory having another structure for data access through multiple wireless communication media. As shown in FIGS. 7-8, this wireless configurable flash memory 200 may include: a storage module 11 configured to store the data, a configurable protocol module 12 configured to parse frames of various protocols according to configuration parameters, a control module 13 configured to control wireless reception and transmission of the data and parsing of wireless protocols and a wireless receiving and transmitting module 14 configured to receive and transmit the data wirelessly.

It should be understood that functions and structures of the storage module 11, the configurable protocol module 12 and the control module 13 in this embodiment have been described in detail in the first embodiment, and are not repeatedly described here.

Specifically, as shown in FIG. 8, the wireless receiving and transmitting module 14 may include a sound receiving and transmitting unit 141 configured to receive and transmit acoustic waves, an antenna unit 142 configured to receive and transmit electromagnetic waves, a light receiving and transmitting unit 143 configured to receive and transmit light waves and a magnetic signal receiving and transmitting unit 144 configured to receive and transmit magnetic signals. The sound receiving and transmitting unit 141 may be any component for mutual conversion between a sound signal and an electric signal, for example a microphone and a loudspeaker. A transmission distance for wireless data communication using a sound wave is relatively close, the wireless configurable flash memory having the sound receiving and transmitting unit 141 may receive not only a wireless sound wave transmitted by a host but also a sound wave emitted by human. For example, when this wireless configurable flash memory 200 is applied to electronic devices equipped with display screens, such as a mobile phone and a television, and read and display of data in the wireless configurable flash memory may be controlled through people's voice. The antenna unit 142 may be configured to receive and transmit data of a plurality of wireless communication protocols, such as a Bluetooth communication protocol and a WIFI communication protocol, and a ZIGBEE protocol, and the like. Of course, the antenna unit 142 may include one or more antennas, and the antennas may be arranged externally to or internally in the wireless configurable flash memory 200. The light receiving and transmitting unit 143 may be any component for mutual conversion between a light signal and an electric signal, such as a photosensor and a laser. The photosensor may be one or more in quantity, and may be configured to identify light rays having different frequencies. The magnetic signal receiving and transmitting unit 144 may be any component for mutual conversion between a magnetic field signal and an electric signal, such as a magnetic sensor etc. One or more units in the wireless receiving and transmitting module 14 may be arranged externally to or internally in the wireless configurable flash memory 200.

It should be understood that, since the configurable protocol module 12 in the present disclosure may be self-adaptive to any wireless communication protocol, the wireless receiving and transmitting module 14 of the present disclosure may adopt a receiving and transmitting component of any wireless transmission medium (for example, a sound wave, a light wave and a magnetic field etc.), rather than significantly increasing area and power consumption of the wireless configurable flash memory.

Embodiment 3

Figure 9:
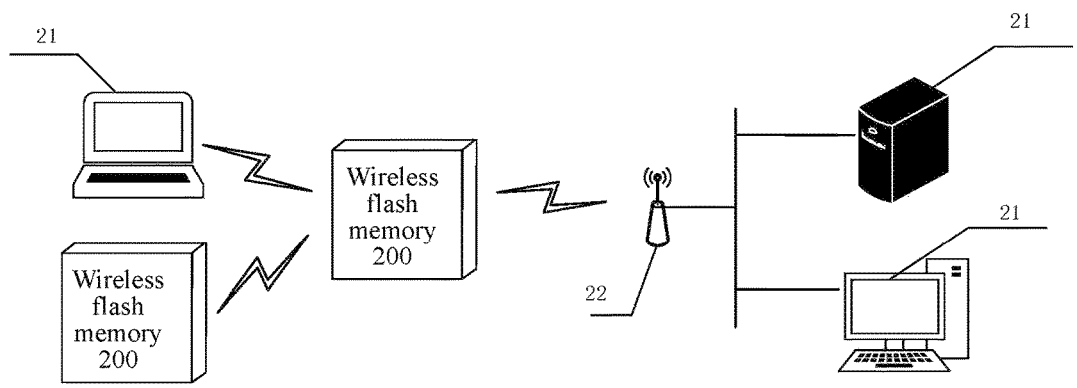
FIG. 9 is a structural diagram of a wireless storage system according to an embodiment of the present disclosure.

This embodiment provides a wireless communication system for wireless access of data to a memory. As shown in FIG. 9, this system includes: one or more wireless configurable flash memories 200 described in the above embodiments (hereinafter, shorted for a wireless flash memory 200), one or more host devices 21 (for example, a laptop) directly communicating with the wireless flash memory 200 and a plurality of host devices (for example, a personal computer, a server, a mobile phone, a television) communicating with the wireless flash memory 200 through one or more access points (AP) 22. The main devices are connected together through a local area network or a wireless local area network. It should be understood that the host devices (for example, a mobile computer 21, another wireless flash memory 200) directly connecting with the wireless flash memory and the access points 22 may be simultaneously or almost simultaneously connected to the wireless flash memory 200. For example, the wireless flash memory 200 may perform wireless data communication in a peer to peer mode or an ad hoc mode.

In this embodiment, two wireless flash memories 200 may communicate with each other wirelessly. In combination with FIG. 7, the wireless flash memory 200 includes the control module 13 configured to control reception and transmission of wireless data and parsing of wireless protocols. Thus, the wireless flash memory 200 may be constructed into a structure for receiving an external triggering signal, thereby controlling reception and transmission of wireless data through the control module 13. For example, the wireless flash memory 200, when receiving the external triggering signal, may transmit wirelessly a read command to another wireless flash memory 200, and the wireless flash memory 200 receiving the read command transmits out data stored. When two wireless flash memories in mutual communication are both the wireless configurable flash memory disclosed in the present disclosure, they can communicate with a default wireless communication protocol, or with appropriate communication protocol according to preset communication strategy which includes but is not limited to optimum energy consumption, optimum speed, optimum distance, and the like. When one of two wireless flash memories in mutual communication is the wireless configurable flash memory disclosed in the present disclosure and the other wireless flash memory is an ordinary wireless flash memory, the wireless configurable flash memory disclosed in the present disclosure serves as the host device, and communicates with the ordinary wireless flash memory with the communication protocol identifiable by the ordinary wireless flash memory. Thus, the wireless configurable flash memories of the present disclosure may achieve not only mutual wireless data communication but also communication with the existing ordinary wireless flash memory, and may perform read/write operation on the ordinary wireless flash memory.

Embodiment 4

Figure 10:
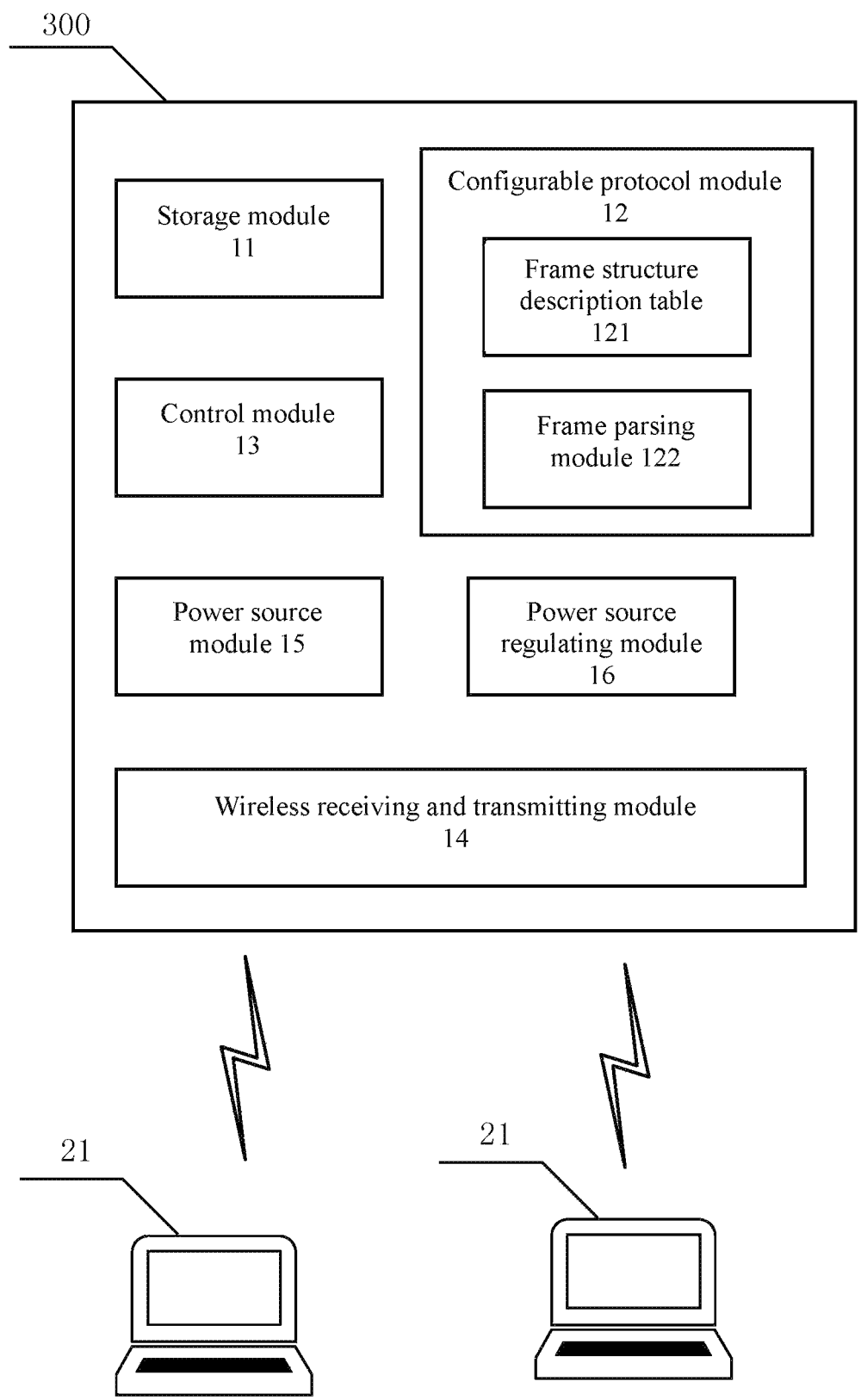
FIG. 10 is a structural diagram of a wireless configurable flash memory according to another embodiment of the present disclosure.

This embodiment provides a wireless configurable flash memory having another structure for wireless access of data in a memory. As shown in FIG. 10, this wireless configurable flash memory 300 may include: a storage module 11 configured to store the data, a configurable protocol module 12 configured to parse frames of various protocols according to a configuration parameter, a control module 13 configured to control wireless reception and transmission of the data and parsing of wireless protocols, a wireless receiving and transmitting module 14 configured to receive and transmit the data wirelessly, a power source module 15 configured to provide power to respective modules contained in the wireless configurable flash memory 300 and a power source regulating module 16 configured to regulate voltage or current provided to one or more modules contained in the wireless configurable flash memory 300.

It should be understood that, functions and structures of the storage module 11, the configurable protocol module 12, the control module 13 and the wireless receiving and transmitting module 14 have been described in detail in embodiment 1 and embodiment 2, and are not repeatedly described here.

The power source module 15 may be a battery, for example a lithium battery, to facilitate operating of the wireless configurable flash memory 300 as a stand-alone device. The power source module 15 may be rechargeable, and may be charged via power that can be supplied to the wireless configurable flash memory by an external power source. Of course, the power source module 15 may obtain power from an outside source as well.

The power source regulating module 16 is configured to supply a stable output voltage with a regulated voltage level to respective modules contained in the wireless configurable flash memory 300. In one aspect, the power source regulating module 16 may raise or decrease voltage provided by the power source module 15 so as to supply electricity for respective modules contained in the wireless configurable flash memory 300. For example, the power source regulating module 16 may supply different voltage to respective modules contained in the wireless configurable flash memory 300.

Embodiment 5

Figure 11:
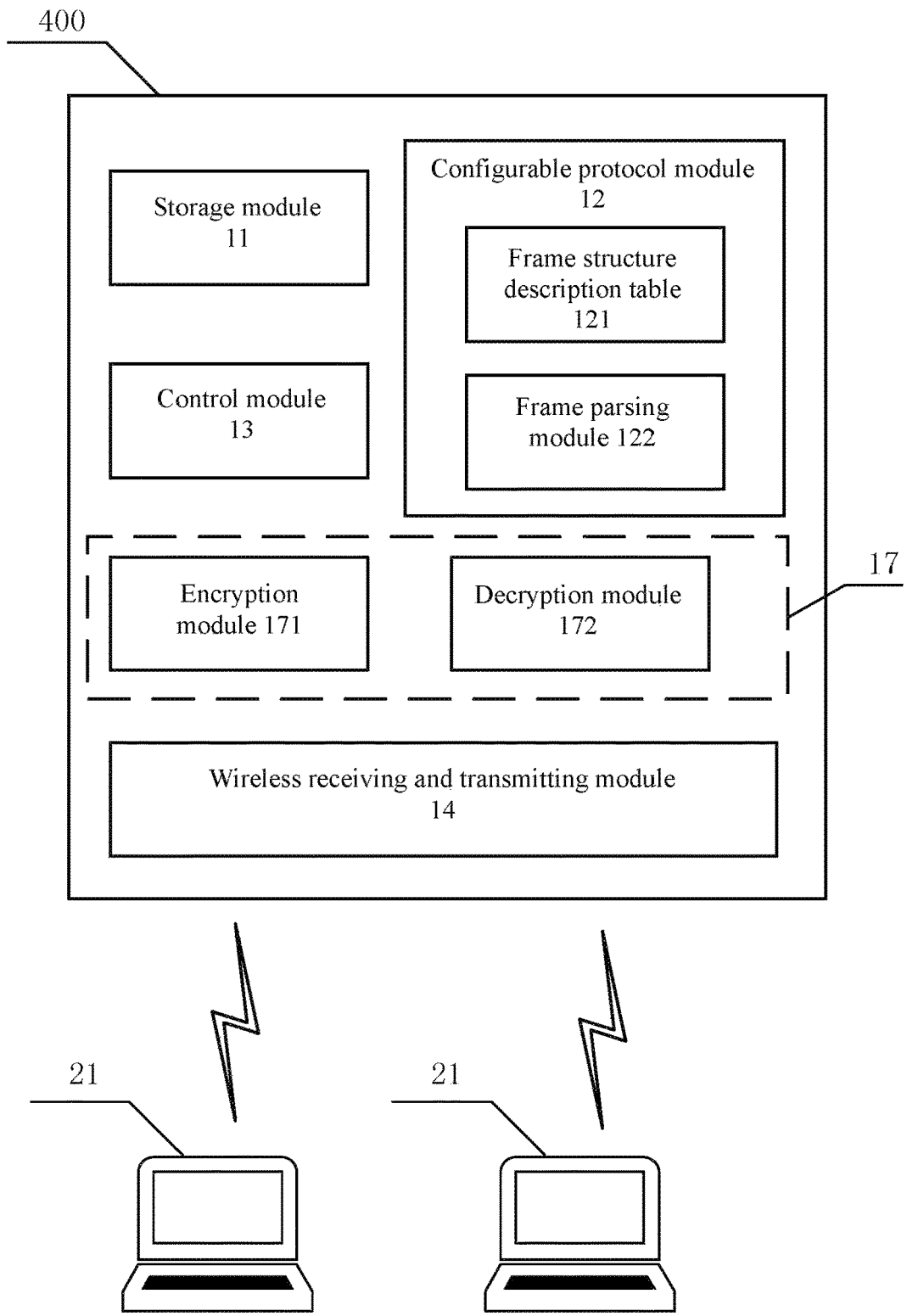
FIG. 11 is a structural diagram of a wireless configurable flash memory according to another embodiment of the present disclosure.

This embodiment provides a wireless configurable flash memory having another structure for wirelessly accessing data in a memory. As shown in FIG. 11, this wireless configurable flash memory 400 may include: a storage module 11 configured to store the data, a configurable protocol module 12 configured to parse frames of various protocols according to a configuration parameter, a control module 13 configured to control wireless reception and transmission of the data and parsing of wireless protocols, a wireless receiving and transmitting module 14 configured to receive and transmit the data wirelessly and a crypto module 17 configured to encrypt or decrypt the data during wireless communication.

It should be understood that, functions and structures of the storage module 11, the configurable protocol module 12, the control module 13 and the wireless receiving and transmitting module 14 have been described in detail in embodiment 1 and embodiment 2, and are not repeatedly described here.

As shown in FIG. 11, the crypto module 17 includes an encryption module 171 and a decryption module 172. The crypto module 17 may encrypt or decrypt data stored in the wireless configurable flash memory 400 or the data transmitted to another device so as to ensure data safety. The crypto module 17 may adopt various cryptographic technologies, such as, but not limited to, Wired Equivalent Privacy (WEP), Wifi Protected Access (WPA), Data Encryption Standard (DES), Advanced Encryption Standard (AES), etc.

Embodiment 6

This embodiment provides an electronic device containing any one of the wireless configurable flash memories described in the above embodiments. For example, this electronic device may be a computer, a mobile phone, a digital phone, a video device, a smart card, a personal digital assistant (PDA), a television, an electronic game machine, a digital camera, an electronic notebook, a media player, a recorder, an electronic device associated with digital rights management, a network card, a GPS device and the like.

What has been described above is only preferred embodiments of the present disclosure which, of course, cannot used to define the claimed scope of the invention. One of ordinary skill in the art can understand that any equivalent changes made according to claims of the present disclosure in the light of the whole or part of the processes in the above embodiments shall fall into the scope of the invention.

I claim:

1. A wireless configurable flash memory that facilitates wireless access of data, comprising:
    a storage module configured to store the data;
    a configurable protocol module configured to parse frames of respective protocols according to a configuration parameter, wherein the configurable protocol module comprises:
        a frame structure description table configured to store a first frame header address pointer, a first frame tail address pointer and a value of each field defined in a communication protocol, wherein the first frame header address pointer and the first frame tail address pointer point to a storage location for the value of each field defined in the communication protocol, and the first frame header address pointer and the first frame tail address pointer are configurable so as to change the value of each field defined in the communication protocol; and
        a frame parsing unit configured to acquire a frame header of received data to acquire values of respective fields of current communication protocol, and parse current communication protocol by comparing values of respective fields of current communication protocol with that of the communication protocol in the frame structure description table; and
    a control module configured to control wireless reception and transmission of the data and parsing of wireless protocols; wherein the control module comprises a protocol state description table configured to store a second frame header address pointer, a second frame tail address pointer and state transition values; the second frame header address pointer and the second frame tail address pointer point to a storage location for state transition values contained in the communication protocol; the control module controls wireless reception and transmission of the data and parsing of wireless protocols according to the state transition values; and the second frame header address pointer and the second frame tail address pointer are configurable so as to change the state transition values stored in the protocol state description table.

2. The wireless configurable flash memory according to claim 1, further comprising a wireless receiving and transmitting module configured to receive and transmit the data wirelessly, wherein the wireless receiving and transmitting module comprises a sound receiving and transmitting unit configured to receive and transmit acoustic waves, an antenna unit configured to receive and transmit electromagnetic waves, a light receiving and transmitting unit configured to receive and transmit light waves and a magnetic signal receiving and transmitting unit configured to receive and transmit magnetic signals.

3. The wireless configurable flash memory according to claim 1, wherein, the control module further comprises a state transition judging unit configured to determine conditions for transferring a state into a next state;
    the state transition judging unit comprises:
        a code value input circuit configured to provide a reconfigurable code value; and
        a logic operation circuit configured to perform logic operation according to the code value provided by the code value input circuit so as to output an operation result to determine whether to transfer into the next state.

4. The wireless configurable flash memory according to claim 3, wherein, the code value comprises:
    an operation code value configured to determine a logic operation type of the logic operation circuit;
    a current triggering event source code value configured to represent a current event source; and
    a target event source code value configured to represent a target event source.

5. The wireless configurable flash memory according to claim 1, further comprising a power source module configured to supply power for respective modules contained in the wireless configurable flash memory.

6. The wireless configurable flash memory according to claim 1, further comprising a power source regulating module configured to regulate one or more voltage or current provided to one or more modules contained in the wireless configurable flash memory.

7. The wireless configurable flash memory according to claim 1, wherein, the wireless configurable flash memory is configured to facilitate wireless communication of the data in a peer to peer mode or an ad hoc mode.

8. The wireless configurable flash memory according to claim 1, further comprising a crypto module configured to encrypt or decrypt the data during wireless communication.

9. An electronic device, comprising the wireless configurable flash memory according to claim 1.

* * * * *